(No Model.)

C. RICHARDS.
ANTI FRICTION PACKING FOR PISTONS.

No. 307,334. Patented Oct. 28, 1884.

WITNESSES:
J. Snowden Bell.
R. H. Whittlesey

INVENTOR.
Charles Richards,
BY George H. Christy
ATTORNEY.

UNITED STATES PATENT OFFICE.

CHARLES RICHARDS, OF CLEVELAND, OHIO.

ANTI-FRICTION PACKING FOR PISTONS.

SPECIFICATION forming part of Letters Patent No. 307,334, dated October 28, 1884.

Application filed April 10, 1884. (No model.)

*To all whom it may concern:*

Be it known that I, CHARLES RICHARDS, a citizen of the United States, residing at Cleveland, in the county of Cuyahoga and State of Ohio, have invented or discovered certain new and useful Improvements in Anti-Friction Packing for Pistons, of which improvements the following is a specification.

Figure 1:
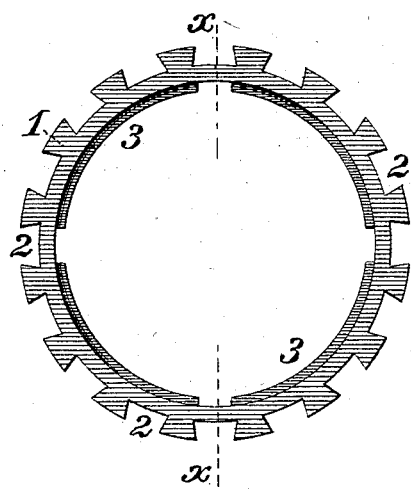
Figure 2:
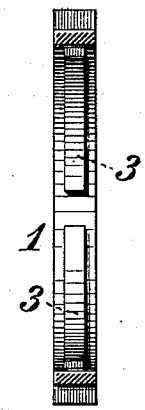
Figure 3:
Figure 4:
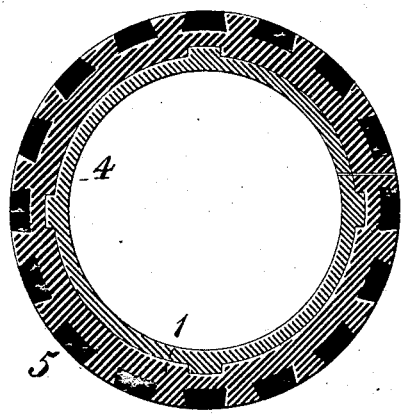
Figure 5:
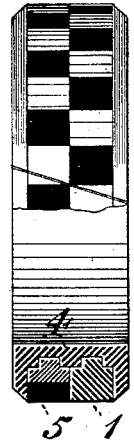

In the accompanying drawings, which make part of this specification, Figure 1 is a side view in elevation of a packing-plate for piston-rings embodying my invention; Fig. 2, a transverse section through the same at the line *x x* of Fig. 1; Fig. 3, a view in elevation of a segmental packing-plate; Fig. 4, a transverse section (partly in elevation) through a piston packing-ring formed of two of the plates shown in Figs. 1 and 2, provided with lubricating filling and suitably united; and Fig. 5, an axial section through the same.

The object of my invention is to provide effective and desirable means for insuring proper lubrication of the bearing-surfaces of packing rings or segments; to which end my improvements consist in a metallic packing-plate of continuous or segmental annular form, having a series of open-sided recesses in its periphery and a rib or projection on its inner face; also, in the combination of a packing-plate, as specified, a filling of lubricating material inserted in the recesses thereof, and an inclosing-casing; also, in the combination of two or more packing-plates, as set forth, a filling of lubricant inserted in the recesses thereof, and a casing uniting and inclosing the packing-plates on their inner surfaces and sides.

The improvements claimed are hereinafter more fully set forth.

To carry out my invention I construct of any metal possessing sufficient strength and hardness a packing-plate, 1, in the form of a ring or annulus, or a segment thereof, and having a series of recesses or slots, 2, formed in its periphery or bearing-surface, said recesses extending from the periphery toward the inner surface of the plate and across the same, thereby presenting a clear opening on three sides—to wit, the periphery and the two sides of the plate. The recesses 2, which are designed to receive a filling of lubricating material in a compressed condition—as, for example, graphite—may be of any desired form and number, being preferably beveled or tapered inwardly, as shown, in order to more firmly retain the filling placed therein, and the insertion and compression to any desired degree of the lubricant in the recesses can be readily and perfectly accomplished, as the recesses are open and unobstructed on their tops and sides. One or more ribs or projections, 3, are formed upon the inner surface of the plate 1; or, as a mechanical equivalent thereof, depressions or indentations may be formed in said surface, in order to enable the plate to be engaged and firmly held by the metal of a casing or support, 4, cast around it, said casing serving to close the sides of the recesses 2 and form the lateral boundary of the lubricant therein, and providing means for uniting the plate with one or more similar plates to form a packing-ring, as presently to be described.

In the construction of packing-rings under my invention, a packing-plate as above described, having its recesses filled with lubricating material, 5, (shown in solid black in the drawings,) is combined with a casing, 4, which is cast around its inner surface and sides. The projections 3 of the plate are embedded in, and the plate thereby firmly held by, the metal of the casing, and the lubricant 5 is incased on every side except on the bearing-surface. The packing-ring so formed is then cut apart, so as to be sprung upon a piston or plunger, or, if a continuous plate be employed, may be divided into segments, to be fitted separately thereon.

In cases where a greater width of bearing-surface is necessary or desirable, two or more packing-plates are placed side by side, and arranged, as shown, so that the filling of each recess shall abut against the metal between the recesses on the adjoining plate, the metal and lubricant being thereby disposed alternately throughout the area of the bearing-surface; and in some cases it may be desirable to alternate metallic surfaces or plain bearing-plates— that is to say, plates unprovided with recesses containing lubricant—with the recessed plates 1. The plates are then united by a casing, 4, cast around their inner surfaces and outer sides, as in the case of the single plate before described.

I claim herein as my invention—

1. A metallic packing-plate of annular form, having a series of open-sided recesses extending across its periphery in planes parallel with its axis, said recesses being adapted to receive a filling of lubricant, and a rib or projection on its inner face adapted to engage the metal of a casing, substantially as set forth.

2. The combination, in a packing ring or segment, of a packing-plate having open-sided recesses in its periphery, a filling of lubricating material inserted in said recesses, and a casing inclosing the packing-plate on its inner surface and sides, substantially as set forth.

3. The combination, in a packing ring or segment, of two or more packing-plates having open-sided recesses in their peripheries, a filling of lubricating material inserted in said recesses, and a casing uniting and inclosing the packing-plates on their inner surfaces and sides, substantially as set forth.

In testimony whereof I have hereunto set my hand.

CHARLES RICHARDS.

Witnesses:
J. SNOWDEN BELL,
R. H. WHITTLESEY.